United States Patent [19]

Lewis

[11] 3,752,910

[45] Aug. 14, 1973

[54] SOLID STATE VIDEO REPRODUCING SYSTEM

[76] Inventor: Herbert H. Lewis, 7314 Stanford St., La Mesa, Calif.

[22] Filed: Dec. 13, 1971

[21] Appl. No.: 206,992

[52] U.S. Cl. .... 178/5.4 EL, 178/7.3 D, 315/169 TV

[51] Int. Cl. .... H04n 9/30

[58] Field of Search .... 178/5.4 EL, 7.3 D, 178/7.5 D; 340/166 R; 315/169 TV

[56] References Cited

UNITED STATES PATENTS

| | | | |
|---|---|---|---|
| 3,021,387 | 2/1962 | Rajchman | 178/7.3 D |
| 3,254,267 | 5/1966 | Sack, Jr. | 178/7.3 D X |
| 3,311,781 | 3/1967 | Duinker et al. | 178/7.3 D X |
| 3,564,135 | 2/1971 | Weimer | 178/7.3 D |

*Primary Examiner*—Robert L. Richardson

*Attorney*—John R. Walker, III

[57] ABSTRACT

A system employing a solid state electroluminescent display panel having a plurality of light emissive elements, e.g., light emissive transistors, and other microelectronic components deposited thereon. The system includes structure for sequentially and selectively controlling the range of various voltages which are applied to the plurality of light emissive elements to reproduce black and white television signals, color television signals, or other analog or digital information. The system also includes a plurality of memory circuits which permits the storage of a complete frame or field of television information. The system additionally includes a pulse generator which produces a pulse at the end of each frame, or field in interlaced scanning, causing a visual presentation on the display panel of the stored video signal information. The system utilizes a video chopper circuit to provide numerous bits of a signal, e.g., the video signal. The bits individually are of various amplitudes and have a uniform pulse width but collectively envelop the changing amplitude of the video signal for a complete field or frame.

22 Claims, 7 Drawing Figures

INVENTOR.

INVENTOR.

Herbert H. Lewis

Patented Aug. 14, 1973 3,752,910

3 Sheets-Sheet 3

INVENTOR.
Herbert Hermes

SOLID STATE VIDEO REPRODUCING SYSTEM

BACKGROUND OF THE INVENTION

1. Field of the Invention

This invention relates to the field of visual electronic displays and is particularly directed toward the art which utilizes an electronic solid state video reproducing system for the presentation of monochrome or multi-color display such as used in a typical television receiver but is not limited solely to such use.

2. Description of the Prior Art

Present day video display systems make almost exclusive use of the kinescope to present the desired visual information to the viewer even though the present trend in television sets is toward solid state circuitry for greater compactness and reliability. Even the most compact kinescope is a bulky device and the addition of the color reproducing components increases the bulk and adds to the cost and complexity. Most of this bulk is directly related to the electron gun.

Most of the disadvantages of the kinescope could be eliminated by means of the solid state video reproducer. These would include (1) bulkiness; (2) danger of glass implosion; (3) X-ray emission; (4) high total power required; (5) very high voltage and frequent component failure. Further, a solid state video reproducer eliminates the need for deflection, convergence and focusing circuits.

Known solid state display systems, e. g., Bray et al. U.S. Pat. No. 3,479,517 and DeBoer U.S. Pat. No. 3,526,711, however, are deficient in brightness, contrast and detail or require exceedingly complex electrical or mechanical arrangements to achieve a suitable visual display.

Attempts have been made to solve the above-mentioned problems by incorporating solid state display systems, e. g., Bray et al. U.S. Pat. No. 3,479,517 and DeBoer U.S. Pat. No. 3,526,711. However, the solid state display systems known by the applicant are deficient in light output, contrast and resolution. Further, these systems require exceedingly complex electrical and/or mechanical arrangements to achieve a visual display. A preliminary patentability search revealed the above-mentioned patents plus the following U. S. Pat: Cistola No. 3,426,248; Camras No. 3,429,995; Chynoweth No. 3,492,489; Osborn et al. No. 3,502,802; Strain No. 3,531,585; and Witmer No. 3,532,809. None of the above references show or suggest applicant's device.

SUMMARY OF THE INVENTION

The present invention is directed towards overcoming the disadvantages and problems relative to the kinescope and, more particularly, it is directed towards overcoming the disadvantages and problems existing in known solid state light emitting display panels.

The present invention utilizes certain well understood electronic and computer concepts. These concepts have been integrated into a computerized electronic system which makes possible the display of video information on a flat viewing screen without resorting to the use of an electron gun. The concept of the present invention is to provide a solid state electronic video reproduction system using a plurality of light emissive elements, e. g., light emissive transistors, and other microelectronic components deposited upon a substrate by means of large scale microelectronic fabricating techniques.

The system of the present invention includes structure for sequentially and selectively controlling a range of various voltages which are applied to the plurality of light emissive elements to reproduce black and white television signals, color television signals, or other analog or digital information.

The system also includes a plurality of memory circuits which permit the storage of a complete frame or field of television information.

The system additionally includes a pulse generator which produces a pulse at the end of each frame, or field when interlaced scanning is utilized, thus "reading out" the stored signals and causing a visual presentation on the display panel of the stored information.

The system utilizes a video chopper circuit to produce numerous discrete bits of a changing amplitude signal, e. g., the video signal. These bits individually are of various amplitudes having a uniform pulse width, but collectively envelop the changing amplitude of the video signal for a complete field or frame.

More significantly, the system of the present invention will produce a video display having a light output and contrast comparable with existing kinescope tubes but with lower power consumption, thus solving one of the most objectionable problems existing in known solid state light emitting display panels.

Further features of the system of the present invention are:

1. The use of an analog to digital memory circuit which allows storage of discrete elements of a picture or other information which may vary in amplitude from instant to instant. Specifically, converting analog information into digital information which is then retrieved as a video display.

2. The use of electroluminescent material to produce a display on the screen of greater brilliance.

3. The use of large scale integrated microelectronic fabrication techniques.

4. The use of a transparent conductive coating, such as glass or microthin aluminum, to serve as the common anode of the plurality of integrated circuit storage and display elements.

5. The use of a pulsed rather than a constant potential applied to the common anode at suitable time intervals, causing a simultaneous conduction of the plurality of video storage elements, thereby producing a visual display of the information stored in the memory elements. In other words, causing each of the microscopic luminescent particles to luminesce to a degree of brightness determined by the amplitude of the video information stored in the individual video storage element.

6. Processing the video information by means of a chopper and pulse shaping network to obtain pulses of uniform width but varying in amplitude, thus insuring that only a precise bit of amplitude information will be stored in each video storage element.

7. The use of lock out circuitry in the scanning or logic circuits to reduce cross talk between each scanned line.

DESCRIPTION OF THE PREFERRED EMBODIMENT

Figure 1:
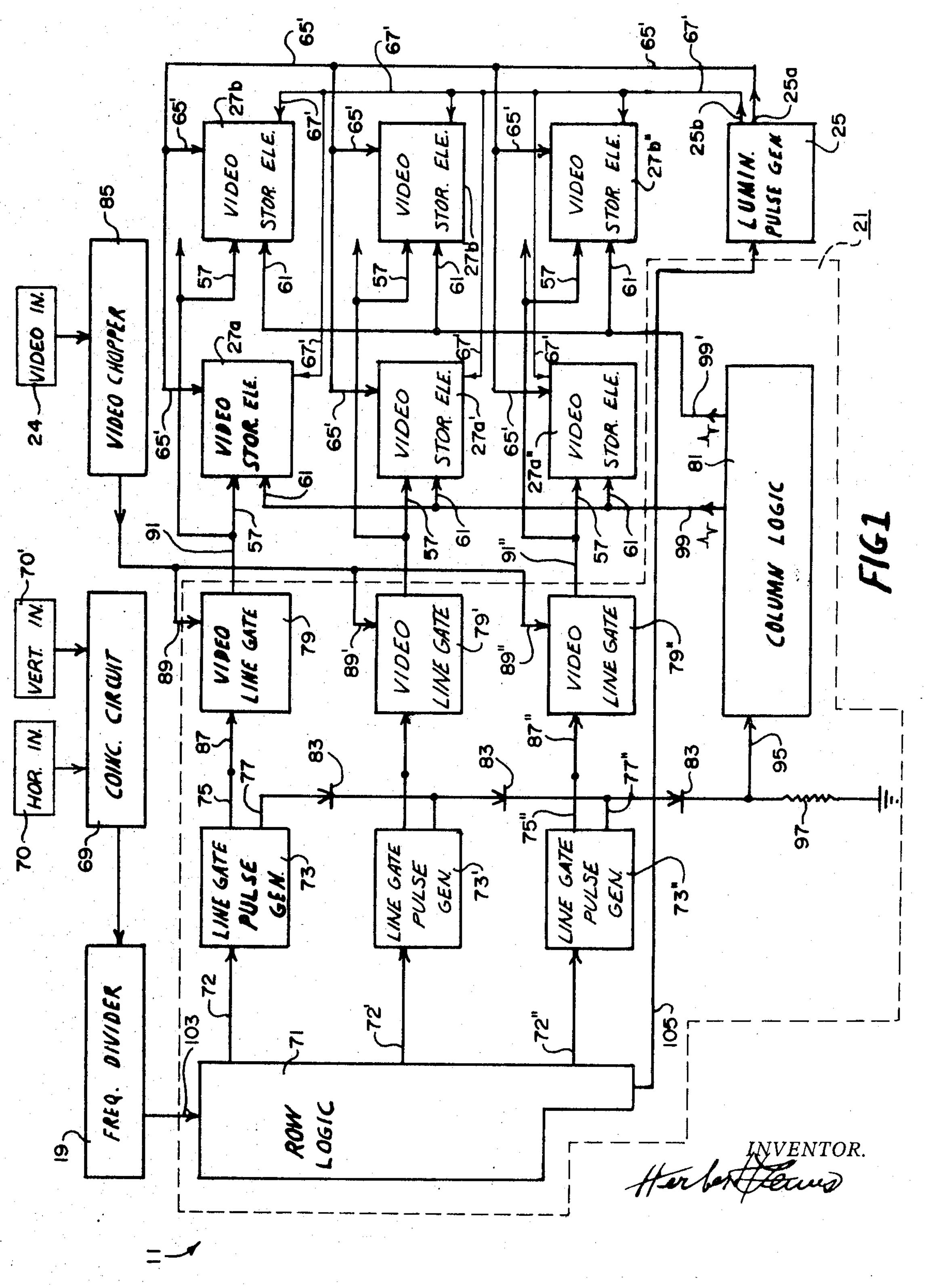
FIG. 1 is a block diagram of the system of the present invention showing the interrelation of the herein-described video storage element with other portions of the system.
Figure 2:
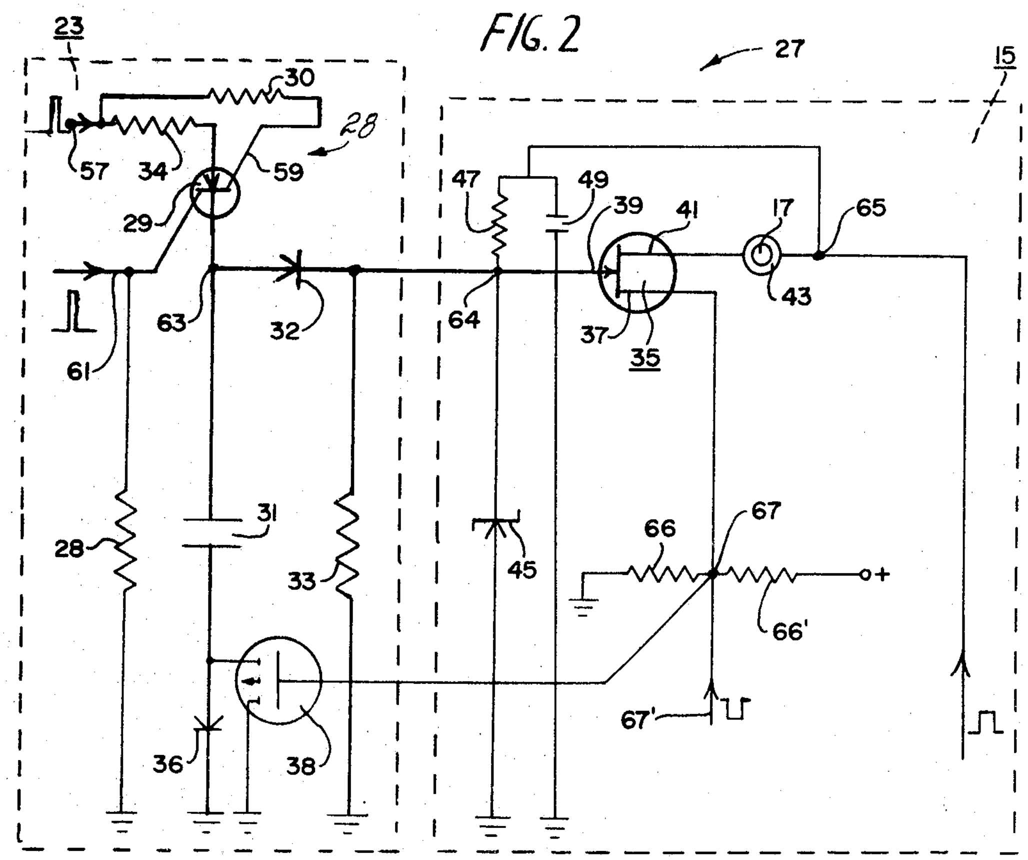
FIG. 2 is a schematic of the video storage element of the present invention.
Figures 3, 4, 5:
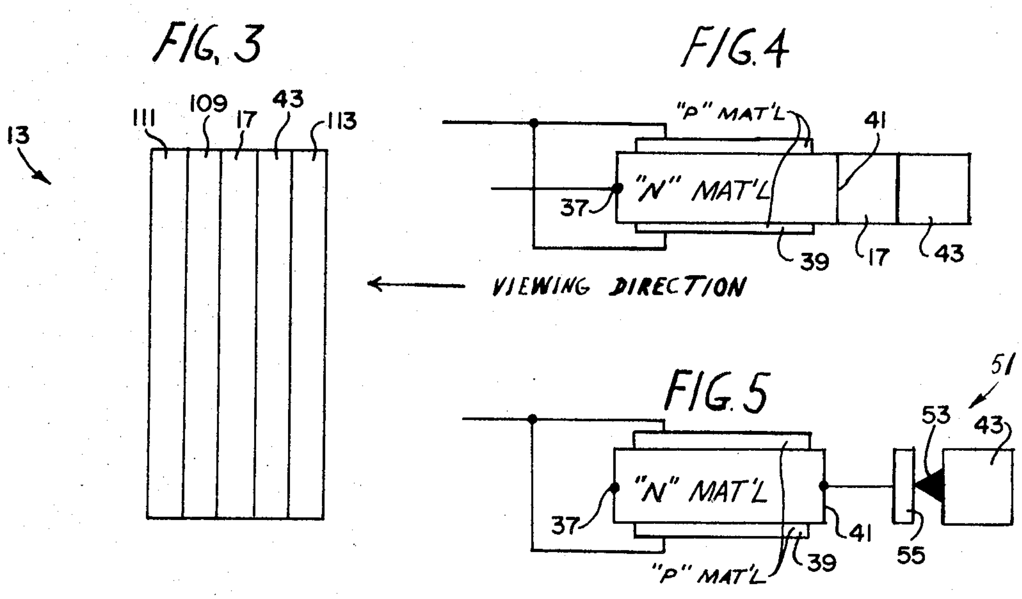
FIG. 3 diagrammatically depicts the display panel of the present invention as it would appear in cross section.
FIG. 4 diagrammatically depicts a light emissive transistor.
FIG. 5 diagrammatically depicts a transistor in series with a light emissive diode.

Referring first to FIGS. 1, 2, and 3 of the drawings wherein it may be seen that the solid state video reproducing system 11 of the present invention is intended for displaying a composite video input signal on a display panel 13, a cross section of which is diagrammatically shown in FIG. 3 of the drawings. The system 11 generally comprises a plurality of signal driver means 15 (FIG. 2) including luminescent means 17, timing pulse means or frequency divider 19 (FIG. 1), electric or first circuit means 21 (FIG. 1) being responsive to the timing pulse means 19, signal storage means 23 (FIG. 2) being jointly responsive to the electric means 21 and the video input signal for storing the video input signal and for determining the operable parameters of the signal driver means 15, and triggering means or luminescence pulse generator 25 (FIG. 1) for causing the signal driver means 15 to read out the signal stored within the signal storage means 23 and thus causing the luminescent means 17 to luminesce individually to a degree of brightness determined by the amplitude of the stored video information and collectively to produce a visual image.

Figures 6, 7:
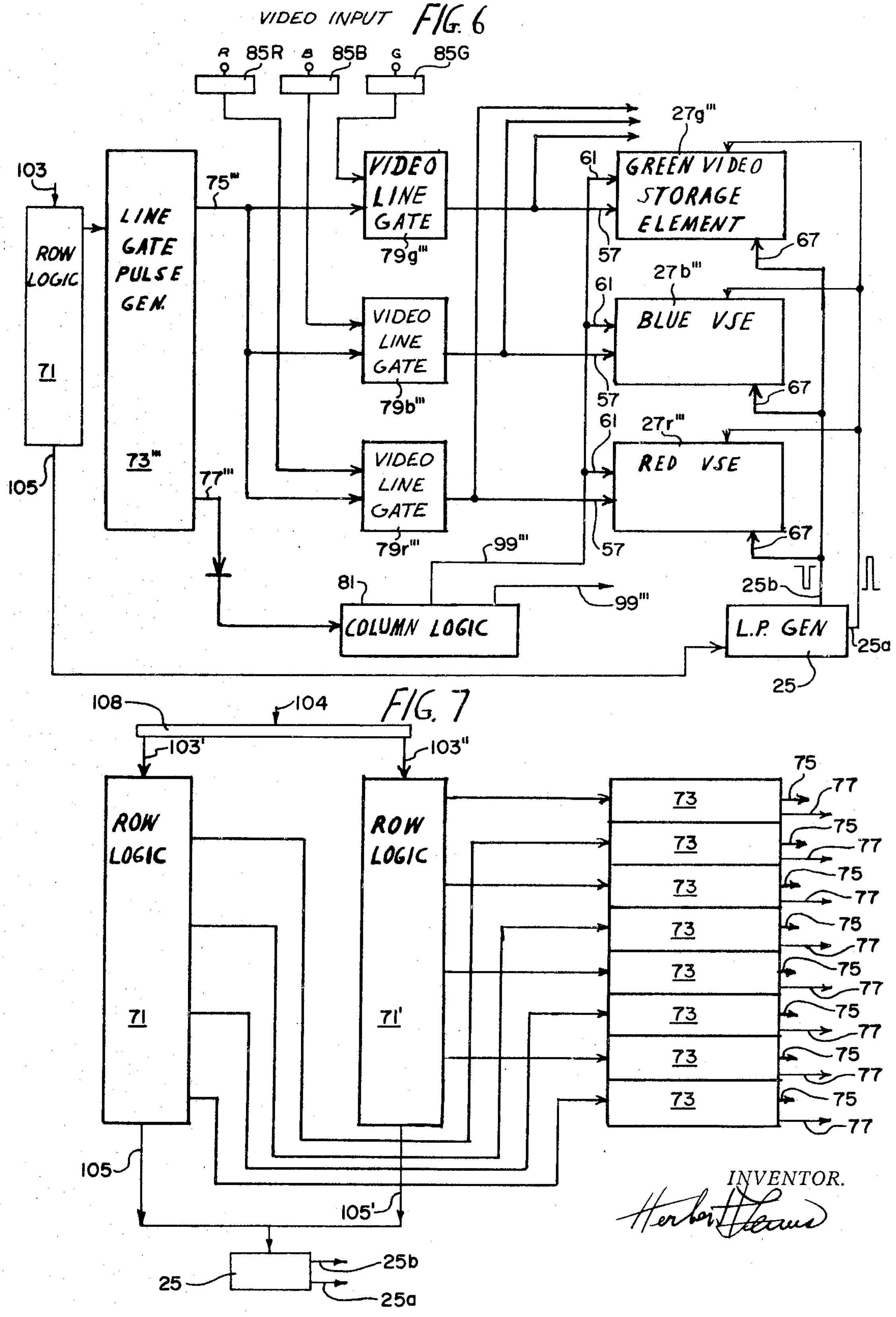
FIG. 6 is a block diagram depicting the application of the solid state video reproducing system of the present invention to a color television display panel.
FIG. 7 is a block diagram depicting the application of the solid state video reproducing system of the present invention with a television system utilizing interlaced scanning.

It should be pointed out that the signal driver means 15 and the signal storage means 23, as shown in FIG. 2, jointly constitute a video storage element 27 as shown in FIGS. 1 and 6 of the drawings. Further, the video input signal alluded to above preferably constitutes the video signal source 24 in existing television receiver equipment, i. e., the signal which usually is coupled to the kinescope. Further, from the above, it may be implied that the video signal alluded to is peculiar to United States television equipment; however, it is not to be so limited since the intent of the present invention is that the various peculiarities around the world, e. g., numbers of lines or rows per frame, etc., are within the spirit and scope of the present invention. In this regard, the following specification will be directed toward United States standards and should be construed as illustrative only or as an expedient in disclosing the present invention.

In order to acquire an understanding of the diagram depicted in FIG. 1, it is desirable to have a better understanding of the signal driver means 15 and the signal storage means 23 constituting the video storage element 27. Accordingly, from FIG. 2 of the drawings, it may be seen that the basic signal storage means 23 includes a second circuit 28 including a silicon controlled switch 29 in series with a resistive capacitive circuit comprising a storage capacitor 31 and a resistor 33, an isolation diode 32, anode isolation resistors 30 and 34 of suitable values, as for example, 10Kohms and 1 K ohms, respectively, gate load resistor 28, a charging diode 36, and a "P" channel field effect transistor 38.

The signal driver means 15 includes a junction field effect transistor 35 having a source 37, a gate 39, and a drain 41, the drain 41 being doped with the electroluminescent means 17 and having a transparent electrically conductive material 43 bonded to the luminescent means 17. It should be understood that in lieu of doping the drain 41 of the transistor 35 with the luminescent means 17, as above disclosed, a light emissive diode 51 (FIG. 5) of construction well known to those skilled in the art having an anode 53 and a cathode 55 may be placed in series with the transistor 35.

Further, FIGS. 4 and 5 of the drawings depict the transistor 35 as being a junction field effect transistor. However, the system 11 is not to be so limited since many three or four terminal active solid state devices may be utilized without departing from the spirit and scope of the present invention. The same may also be said of the silicon controlled switch 29. The signal driver means 15 also includes a zener diode 45 and a resistive capacitive circuit comprising a resistor 47 and a capacitor 49.

With further reference to FIG. 2 of the drawings, it may be seen that the signal storage means 23 is provided with an anode terminal 57 for applying the video input signal, an anode gate 59, and a gate terminal 61 having a differentiated positive pulse applied thereto generated by structure yet to be disclosed. The capacitor 31 and the diode 32 are connected to a cathode terminal 63 common to the silicon control switch 29, and resistor 33 is connected between the cathode of diode 32 and ground. The signal driver means 15 includes a common terminal 64 connected to the terminal 63, i. e., the terminal 64 interconnects the gate 39 of the transistor 35, one end of the zener diode 45, and one end of the resistor 47. The signal driver means 15 also includes a terminal 65 having the other end of the resistor 47 and one end of the capacitor 49 attached thereto and the anode or transparent conductive material 43 also connected thereto. The second terminal of 49 is connected to terminal 64. Additionally, the terminal 65 is intended to receive a positive pulse from the triggering means or luminescent pulse generator 25 through the conductor 65'.

The source 37 of transistor 35 is biased to the "pinch off" point using the bias arrangement shown in FIG. 2. In other words, normally gate 39 is biased negatively to the "pinch off" point so that no current flows from source 37 to drain 41 until the desired time as will be better understood in the description of the operation to follow later in the specification. Thus, a pair of resistors 66, 66' are interconnected at the junction 67 which is connected to source 37. The opposite end of resistor 66 remote from junction 67 is grounded and the remote end of 66' is connected to a suitable positive fixed bias source, not shown. Junction 67, and therefore source 37, is adapted to receive a negative pulse from the triggering means or luminescent pulse generator 25 through the conductor 67'. The negative pulse from pulse generator 25 is a pulse similar to the heretofore-mentioned positive pulse from pulse generator 25 but is of opposite polarity, that is, it is in time with the positive pulse and of the same duration but is negative rather than positive. The purpose of said negative pulse is to overcome the "pinch off bias" and to establish the correct operating parameters for transistor 35 during the time that it is conducting and for purposes yet to be described. In other words, the first condition for transistor 35 to conduct is the necessity to overcome the normal "pinch off" bias of transistor 35 by the charge on capacitor 31 plus the above-mentioned negative pulse on source 37. The second condition for transistor 35 to conduct is the necessity of the heretofore mentioned positive pulse being applied to drain 41. Thus, for transistor 35 to conduct both of the two above-mentioned conditions must be met.

The circuit shown and just described as a video storage element 27 is to be construed as a preferred embodiment or as an expedient in disclosing the substance of the present invention. Other circuits well known to those skilled in the art for accomplishing the same function are intended to be within the spirit and scope of the present invention.

Particular attention is now directed to FIG. 1 of the drawings wherein it may be seen that a coincidence circuit 69 of a construction well known to those skilled in the art utilizes the outputs from the horizontal and vertical sync separators 70, 70' within the particular television receiver (not shown) to obtain a frame initiation or clock pulse for proper picture synchronization with a particular television transmitter. It should be obvious to those skilled in the art that the coincidence circuit or "AND" gate 69 is intended to insure that the system 11 is simply in phase with the peculiarities of the received video signal 24. The output of the coincidence circuit 69 is coupled to the timing pulse means 19 comprising a frequency divider or field initiation circuit or clock pulse circuit of a construction well known to those skilled in the art.

The clock pulse from the timing pulse means 19 is coupled to a row logic circuit 71 of known construction, e. g., a ring counter circuit or the like which generates a predetermined number of pulses of a predetermined pulse duration and at a uniform pulse recurring rate. In this regard, the row logic means 71 of the present invention preferably generates at least 525 pulses so as to correspond with the United States standard of 525 lines or rows per frame. However, it will be more apparent when the remaining structure has been disclosed that an additional pulse identified herein as a field or frame termination pulse is generated by the row logic means 71, i. e., the field or frame termination pulse being the 526th pulse.

The row logic means 71 has a plurality of output terminals 72, 72', 72'', etc., for a total of 525 when considering only the United States television standards. At each of the terminals identical pulses are developed which are respectively coupled to the line gate pulse generators 73, i. e., the pulse from the terminal 72 is coupled to the line gate pulse generator 73, the pulse from the terminal 72' is coupled to the line gate pulse generator 73', the pulse from the terminal 72'' is coupled to the line gate pulse generator 73'', etc., for the 525 lines.

It should be understood that in the interest of brevity only three line gate pulse generators 73, 73', 73'' are depicted, the remaining ones being simply a repetition of the three depicted. Each of the line gate pulse generators 73 develops a pair of output pulses at terminals 75, 75', 75'', and 77, 77', 77'' respectively which are coupled to the succeeding stages.

In other words, the output terminal 75 couples a pulse to a video line gate 79 of well known construction and the output terminal 77 couples a pulse to the column logic means 81, e. g., a ring counter circuit or the like.

The pulse from the output terminal 77 of the line gate pulse generator 73 is coupled to an input terminal 95 of the column logic means 81. It should be noted that an input load resistor 97 preferably is connected to the input terminal 95 which develops positive line gating pulses on the input terminal 95.

It should be understood that the line gate pulse generators 73 preferably consist of monostable multivibrator circuits of well known construction. However, the line gate pulse generators 73 may consist of other well known circuits obvious to those skilled in the art.

From FIG. 1 of the drawings, it may be seen that a plurality of isolation diodes 83 are interposed between the output terminals 77, 77', 77'' of the line gate pulse generators 73, 73', 73''. It will be appreciated that these isolation diodes 83 reduce interaction between each scan line and column logic means 81.

The column logic means 81, preferably consisting of a ring counter circuit of well known construction, is triggered by the pulses from the line gate pulse generators 73, 73', 73'', etc., for the 525 lines. The column logic 81 has output terminals equal in number to the quantity of video storage elements 27 in each of the 525 lines. The output of the column logic 81 is a succession of very short duration positive and negative pulses, the initial pulses appearing on the output terminal 99, the following pulses appearing on the terminal 99', etc., for the remaining output terminals.

From the foregoing, it should now be obvious to those skilled in the art that I am able to obtain a suitable video display by arranging the video storage elements 27 in a row and column configuration. Additionally, other configurations might be suitable which are intended to be within the spirit and scope of the present invention. However, when arranged in the row and column configuration, each video storage element 27 can be selectively and sequentially controlled by the electric or first circuit means herein disclosed. In other words, the electric or first circuit means 21 includes the row logic means 71, a plurality of line gate pulse generating means 73, 73', 73'', etc., a plurality of video line gate means 79, 79', 79'', etc., and the column logic means 81.

Referring again to FIG. 2 of the drawings wherein the various components are interconnected, representative values will be assigned to the various components for establishing a better understanding of the circuitry only. In other words, the video storage element 27 is not to be limited to the specified values for the components since other values may be equally effective or, in certain cases, more desirable by those skilled in the art. The value of the storage capacitor 31 is approximately 5 pico farads, the value for the resistor 33 is approximately 10 megohms, the value for the resistor 47 is approximately 50K ohms, and the value for the capacitor 49 is approximately 0.05 mfds.

Additionally, certain representative pulse widths will be herein disclosed in order to provide a better understanding of the system 11. In other words, the present invention is not to be limited to the pulse widths mentioned since it will be obvious to those skilled in the art that certain other pulse widths are equally effective and may be more desirable, depending upon the pecularities of the video input signal and the number of lines per frame, etc. With this in mind, the pulse from row logic 71 might have a duration of 2 microseconds, the pulse from line gate pulse generators 73, 73', 73'' might have a pulse duration of 63 microseconds, and the output pulses from the column logic means 81 might have a pulse duration of 0.06 microseconds. Also, the field or frame termination pulse might have a pulse duration of 2 microseconds.

Attention is now directed to FIG. 2 of the drawings which illustrates a single video storage element. However, the following explanation should also be considered in the context of the plurality of video storage elements that would be required.

In order for the silicon controlled switch to conduct, a positive gating pulse must be applied to the terminal 61 coincidentally with a video pulse applied to terminal 57. immediately following the positive gating pulse, a negative turn off pulse is applied to terminal 61 which terminates conduction of the silicon controlled switch 29.

During the conduction of 29, a voltage having an amplitude which is proportional to the applied video pulse amplitude, appears across and is stored by the storage capacitor 31. The capacitor 31 is isolated from ground by the charging diode 36 and the previously described transistor 38. The capacitor 31 retains this charge until the transistor 38 is gated into conduction by the negative pulse from the junction 67, thus providing a discharge path for capacitor 31 through transistor 38 to ground, thence through resistor 33, and the diode 32.

The voltage stored in capacitor 31 is applied as forward bias to the gate of the video driver transistor 35. However, as heretofore explained, in the absence of a negative pulse at junction 67 and a positive pulse at the drain 41, the video driver transistor 35 cannot conduct.

When the field or frame is completely scanned, the row logic means 71 generates the field or frame termination pulse which triggers the luminescence pulse generator 25 in a well known manner. The luminescence pulse generator 25 then applies a positive pulse to each of the drain anode terminals 41 and simultaneously a negative pulse to each of the source terminals 37 of the plurality of video storage elements 27 (27*a*, 27*a*', 27*a*'', 27*b*, 27*b*', etc.). Accordingly, the plurality of transistors 35 will conduct, allowing a current to flow from the source 37 to the drain 41 of the transistor 35, thence through the luminescence means 17 and the conductive coating or anode 43, thence to the luminescence pulse generator.

It will be understood that in FIG. 2 there is only shown a portion of the anode 43 and that anode 43 is a transparent coating which extends over the entire display panel and which is the common anode for the remainder of the video drivers. Also, it will be understood that the luminescence means 17 as shown in FIG. 2 is only a portion of the total luminescence means which also extends over the entire display panel. All the terminals 65 of the video storage elements 27 (27a, 27*a*', 27'', etc.) are interconnected by the conductor 65' as shown in FIG. 1 with common output terminal 25*a* of the luminescence pulse generator 25, and all of the terminals 67 of the video storage elements 27 (27*a*,27*a*', 27*a*'', etc.) are interconnected by conductors 67' as shown in FIG. 1 with the common output terminal 25*b* of the luminescence pulse generator 25.

The amount of current flow across each of the luminescent means 17, and, therefore, the degree of brightness thereof is directly proportional to the amplitude of the discrete bits of the video signal stored in each of the million or more storage capacitors 31, since the amplitude of the pulse at each of the terminals 65, 67 is constant for a given set of operating parameters. When the luminescence pulse reaches a predetermined amplitude, the zener diode 45 will conduct, thereby permitting the storage capacitors 31 to discharge rapidly and resetting the storage element 27 to virtually zero potential. The resistive capacitive circuit comprising the resistor 47 and the capacitor 49 in combination with the zener diode 45 also provides a time delay to enable the luminescence means 17 to first be activated to a brilliance proportional to the charge on the capacitor 31 before resetting the storage circuit to zero.

The foregoing disclosure of the operation of the video storage element 27 will be beneficial in understanding the operaion of the over-all system 1 (FIG. 1) which will now be disclosed.

In the process of explaining the operation of the system 11, it would be desirable that each video storage element 27 be readily identified one from the other. Accordingly, the first row or line of video storage elements is represented by only two video storage elements, i. e., the storage elements 27*a*, 27*b*. The second row or line of video storage elements is identified by the video storage elements 27*a*', 27*b*', etc. The third row or line of video storage elements is represented by the two video stoage elements 27*a*'', 27*b*'', etc.

The video input signal is first applied to the system 11 by a video chopper 85. The video chopper 85 receives the video signal from signalsource 24 and converts it into a plurality of well defined discrete bits. For example, the signal constituting the first line of the 525 lines might be broken into 1,900 pulses, the envelope of the 1,900 pulses beIng the video signal for one of the lines. In this instance, while only two are shown, the system 11 preferably would have approximately 1,900 video storage elements 27 in each of the 525 rows or lines when referring to a monochrome vi:eo system.

For color television the same number of elements would be required. However, they would be divided equally among the three primary colors of red, blue and green, allowing approximately 630 elements 27 for each primary color which will be more fully appreciated later on in the specification.

The output from the video chopper 85 is coupled to the plurality of video line gates 79, i. e., one video line gate per line. The video line gate 79 preferably comprises a coincidence circuit of known construction having first and second input terminals 87, 89 and an output terminal 91, the gate terminal 87 having applied thereto a gating pulse from line gate pulse generator 73 and the second input terminal 89 being connected to the output of the video chopper 85. Therefore, the output signal from the video line gate 79 is dependent upon the simultaneous application of signals to the first and second input terminals 87 and 89; the output signal from the video line gate 79 being a succession of discrete bits of the video input signal and which is coupled to certain ones of the plurality of input terminals 57 of the signal storage means 23.

In the interest of brevity, only three video line gates 79, 79′, 79″are depicted and correspond to rows one, two and three respectively and having paris of input terminals 87, 89 and 87′, 89′ and 87″, 89″, etc., and output terminals 91, 91′, 91″etc., respectively for the total number of required lines.

Operation of the system 11 is initiated by the clock pulse obtained from the coincidence circuit 69 and the frequency divider 19 in a manner previously described. The clock pulse is applied to an input terminal 103 of the horizontal ring counter or row logic 71. From output 72 of the row logic 71, a pulse is applied to the line gate pulse generator 73 which develops two gate pulses, one at each output terminal 75, 77. One pulse is applied to the video line gate 79 and the other pulse is simultaneously applied to the column logic 81 by way of the isolation diodes 83.

When both the line gate pulse and the video information pulse are present at the video gate 79, the gate is open, permitting the video information to appear on the plurality of input terminals 57 of the video storage elements **27*a*, 27*b*, etc., of the first line only. The pulse from the output terminal 77 of the line gate pulse generator 73 has simultaneously initiated the operation of the column logic 81 which generates very short duration positive and negative pulses that are sequentially applied to each column. The first column pulse from output terminal 99 is felt on the gate terminals 61 of the 525 video storage elements 27*a*, 27*a*′, 27*a*″, etc., in column one. Since the column pulse from 99 and the video signal pulse from 91 are both present only at storage element 27*a*, the silicon controlled switch 29 within the video storage element 27*a* will conduct the storage capacitor 31** thereof will store that discrete bit of the video signal.

Approximately 0.06 microseconds later the output terminal 99′ will apply a pulse to the 525 gate terminals 61 of the second column of video storage elements **27*b*, 27*b*′, 27*b*″, etc., but which is coincident only with the video signal appearing on terminal 57 of storage element 27*b*. This allows 27*b* to store the second discrete bit of the video signal applied at that instant. The procedure described above is repeated for each additional column in the display (not shown) and in this manner each video storage element 27** of the first row or line is sequentially and selectively controlled.

It should be noted that even though the video signal is still present at terminal 57 of **27*a* and 27*b***, etc., the information already stored therein will not be disturbed since the column gating pulse is absent.

Additionally, when a pulse is not present on the output terminal 72 of the row logic means 71, the pulse on the output terminal 99 of the column logic 81 will not alter the discrete bit of video stored in the video storage element **27*a* even through the input terminal 61 thereof senses the pulse from the output terminal 99 of the column logic 81. In other words, there is no coincidence between row logic 71 and column logic 81.**

After the first line of video storage elements **27*a*, 27*b*, etc., is scanned, a pulse is then generated at output terminal 72′ of the row logic 71. This pulse is applied to the line gate generator 73′ of row two which generates a second pair of gate pulses, i.e., 63 microseconds or the like, at the output terminal 75′, 77′. The 63 microsecond pulse is applied to the video line gate 79′ and simultaneously to the column logic 81 which initiates another succession of very short duration pulses that appear at the respective output terminals 99, 99′, etc. Since the line gate pulse and the video are both present at the video line gate 79′, it opens, allowing the video to appear on the video input terminals 57 of the second row of video storage elements 27*a*′, 27*b*′, etc. During the first 0.06 microseconds or the like, the video storage element 27*a*′*0* stores the first discrete bit of video information, i. e., during the time that the output terminal 99 of the column logic 81 has a pulse thereon. Subsequently, video storage element 27*b*′ stores a discrete bit of video information. In this manner each succeeding video storage element 27** in the second line or row stores the succeeding bits of video information sequentially.

It should be understood that the above-described Process for storing discrete bits of information in the first two rows or lines is repeated for all 525 lines which is one frame of television video. Obviously, the number of scan lines is optional and may vary in other applications as previously described.

Upon the completion of a field or frame, a field termination pulse will appear at output terminal 105 of 71 and is applied to the luminescence pulse generator 25. Suitably this can be a silicon controlled rectifier used in conjunction with a storage capacitor or other such devices as are available to the state of the art. The positive pulse at output terminal **25*a* of 25 will be applied simultaneously to all the video storage elements 27 in the display panel by means of the conductive transparent coating 43 acting as a common anode. Also, as previously described, the pulse at output terminal 25*b* will be applied at the same time as the pulse at output terminal 25*a*. As described previously, each storage capacitor in each video storage element 27 will forward bias each light emissive transistor 35 causing each to conduct current through the electroluminescent material 17, the current thereacross causing light to be emitted that is proportional in brightness to the amount of current flowing in each transistor 35. As a result, an image appears on the display panel 13, which corresponds to the composite video information originally stored in the plurality of storage elements 27.**

A feature of the present invention is that the brightness of the image on the display panel 13 can be varied by suitable control of the amplitude of the luminescence pulse. Since the luminescence pulse also resets all the video storage elements 27 in the manner previously described, the display panel 13 is now ready to store the second field or frame of video information. This process can be repeated at a rate to meet present television standards but is not to be so limited.

The present invention may also be adapted to interlaced scanning by using the row logic or ring counters 71, 71′ as shown in FIG. 7. The clock pulses from the frequency divider 19 are coupled to a well known electronic switching means, e. g., a solid state multivibrator 108 having an input terminal 104 and a pair of output terminals alternately having pulses thereon. The output terminals of the multivibrator 108 respectively are connected to the input terminals 103, 103″ of the two ring counters 71, 71′. The multivibrator 108 is reponsive to the timing pulse, i. e., the input terminal 104 thereof being connected to the output terminal of the frequency divider 19. The output of the ring counter 71 preferably is applied to the second, fourth, sixth, and subsequent even lines of the 525 lines. The output from the ring counter 71' is applied to the first, third, fifth, and subsequent odd numbered lines of the 525 lines.

From FIG. 7 of the drawings, it may also be seen that in the interest of brevity, only eight rows of line gate pulse generators 73 are shown. It should be obvious to those skilled in the art that the line pulse generators 73 depicted in FIG. 7 are identical to the line pulse generators depicted in FIG. 1 of the drawings. Accordingly, the output terminals 75, 77 of the respective line gate pulse generators 73 in FIG. 7 are identical to the output terminals 75, 77 depicted in FIG. 1 and previously disclosed, i. e., one for each of the 525 lines.

In operation, a pulse from the multivibrator 108 is applied to the input terminal 103' of the ring counter 71 which generates a series of pulses as previously described that are applied successively to the even numbered rows. Each line gate pulse generator initiates the operation of the column logic means 81 which then scans each successive line of storage elements 27, thereby storing one field of video information. The ring counter 71 then generates a field termination pulse at output terminal 105 thereof which triggers the luminescence pulse generator 25, thus causing a visual presentation on the panel 13 of the stored video information. Subsequently thereto, a pulse from the multivibrator 108 is applied to the input terminal 103'' of the ring counter 71' and another series of pulses is generated and applied successively to the odd numbered rows of line gate pulse generators 73, thereby storing the second field of video information, in the manner previously described. At this time, the ring counter 71' generates a field termination pulse which appears on output terminal 105', again triggering the luminescence pulse generator 25, thus giving a visual presentation of the second field of video information, the two field comprising one frame of video information.

From FIG. 6 of the drawings, it may be seen how the system 11 of the present invention can be used to provide a color video display. A single line gate pulse generator 73''' controls three video line gates 79 which in turn individually control a red video storage element **27*r*''', a blue video storage element 27*b*''', and a green video storage element 27*g*''', the three combined comprising a color triad. A pulse from the row logic counter 71 is applied to the input of the line gate pulse generator 73'''. A gating pulse, e. g., 63 microseconds duration or the like, is taken from the output terminal 75''' of the line gate pulse generator 73''' and simultaneously applied to the video line gates 79*r*''', 79*g*''', and 79*b*'''. Simultaneously a pulse from terminal 77''' triggers the column logic means 81**.

A pulse of very short duration, e. g., 0.06 microseconds or the like, appears on the output terminal 99''' of the column logic means 81 and is applied to the red, blue and green video storage elements **27*r*''', 27*b*''', and 27*g*''', permitting the corresponding color information to be stored in the respective video storage element. As column logic pulses are generated, they appear on the succeeding output terminal of 81 in the manner previously described, thus enabling each succeeding color triad to selectively and sequentially store discrete bits of color video information. Subsequent to all the lines in a field being scanned, the row logic 71 triggers the luminescence pulse generator 25, causing it to generate the luminescence pulse which is applied to the common anode terminals 65' and common source terminals 67'** as previously described, thus producing the desired visual color display for the viewer.

Referring still to FIG. 6 of the drawings, each of the video line gates **79*g*''', 79*b*''', and 79*r*''', preferably are preceded by individual video choppers like the video chopper 85** previously described. In other words, the respective red, blue and green signals are fed into three choppers which respectively convert the red, blue and green signals into discrete bits of red, blue and green signals or spikes having an envelope comprising the respective red, blue and green signals.

Accordingly, the storage capacitors 31 for the three video storage elements **27*g*''', 27*b*''', and 27*r*''' are charged simultaneously. In other words, the three video storage elements 27*g*''', 27*b*''', and 27*r*''' correspond to only one video storage element in FIG. 1 of the drawings for a monochrome display, e. g., the video storage element 27*a***.

Referring now to FIG. 3 of the drawings wherein a cross section of the display panel 13 is diagrammatically depicted, the large scale integrated circuitry etched components are character referenced by the numeral 109 and are deposited on a substrate by using large scale microelectronic fabricating techniques. The electroluminescent material 17 is then bonded to the etched components in a manner like that depicted in FIGS. 4 or 5 of the drawing. It should be understood that it would be desirable that each luminescence means 17 be separated one from the other by an electrical insulative substance, e. g., black mylar. The transparent electrically conductive material 43 is then bonded to the electroluminescent material 17, thus forming a common anode means. A viewing lens 113 is then placed over the common anode means 43.

Although the invention has been described and illustrated with respect to a preferred embodiment thereof, it is not to be so limited since changes and modifications may be made therein which are within the full intended scope of the present invention.

I claim:

1. An electronic solid state video reproducing system for displaying a video input signal comprising timing pulse means, first circuit means responsive to said timing pulse means, a plurality of video storage elements respectively including a like plurality of signal driver means and a like plurality of associated signal storage means responsive to said first circuit means and the video input signal for storing the video input signal, said plurality of said signal driver means respectively including a like plurality of luminescence means to provide with each of said signal storage menas an associated one of said luminescence means, and triggering means for causing said plurality of signal driver means to read out simultaneously the video input signal stored in said plurality of signal storage means causing said plurality of liminescence means to luminesce simultaneously and provide a complete video image.

2. The system of claim 1 in which is included a substrate and said plurality of signal driver means additionally includes anode means common to each of said plurality of signal driver means, said substrate having deposited thereon: said plurality of signal driver means including said anode means and said plurality of liminescence means, said timing pulse means, said first circuit means, said plurality of signal storage means, and said triggering means; and in which said triggering means includes means for applying a luminescence pulse to said anode means for causing said plurality of signal driver means to read out the video input signal stored in said plurality of signal storage means.

3. The system of claim 2 in which said timing pulse means includes means for generating a field termination pulse and said luminescence pulse generator means being gated into operation by said field termination pulse.

4. The system of claim 2 in which said plurality of luminescence means respectively include a plurality of microscopic isolated particles which luminesce when a voltage is applied thereacross and said plurality of signal driver meu0s respectively include a plurality of transistors.

5. The system of claim 4 in which said p'urality of transistors respectively include drains, said luminescence particles respectively being bonded to said drains, and said anode means comprises a plurality of microscopic particles of a transparent conductive material respectively being bonded to said luminescence particles and being interconnected one with the other establishing said anode means.

6. The system of claim 4 in which said plurality of signal driver means respectively include a plurality of diodes respectively having anodes, said luminescence particles respectively being bonded to said anodes, and said anode means cimprises a plurality of microscopic particles of a transparent conductive material respectively being bonded to said luminescence particles and being interconnected and with the other establishing said anode means.

7. The system of claim 4 in which said particles of electro-luminescent material consist of a substance for causing said video image to be provided in black and white.

8. The system of claim 4 in which said particles of electro-luminescent particles consist of color triads for causing said video image to be provided in a multicolored natural-like image.

9. The system of claim 4 in which said electroluminescent particles are uniformly arranged on said substrate in row and column configuration.

10. The system of claim 9 in which said first circuit means responsive to said timing pulse means comprises row logic means; a plurality of line gate pulse generating means, a plurality of video line gate means, and column logic means; and in which said plurality of signal storage means respectively comprise a plurality of second circuit means and an equal number of associated storage capacitors, said first circuit means selectively and sequentially controlling the application of a variety of certain voltages across said plurality of electroluminescent particles, said row logic means includes means for generating at least a first pulse for each of said rows of electroluminescent particles said line gate pulse generator means respectively being coupled to said video line gate means and said column logic means and responsive to said first pulse to generate a second pulse of predetermined duration to trigger said column logic means, said column logic means includes means responsive to said line gate pulse generating means for generating a third pulse for each of said columns, said video line gate means being responsive to said second pulse and the video input signal to provide a plurality of discrete bits of the video input signal to said plurality of second circuit means, said second circuit means being individually responsive to one of said plurality of third pulses and to one of said plurality of discrete bits of the video input signal to permit the output thereof to charge an associated one of said plurality of storage capacitors in proportion to the amplitude of one of said plurality of discrete bits of the video input signal.

11. The system of claim 10 in which said row and column logic means respectively consists of ring counter circuits.

12. The system of claim 10 in which said means for generating said second pulse consists of a monostable multivibrator circuit.

13. The system of claim 10 in which said timing pulse means includes means for generating a frame termination pulse and in which said means for generating said luminescence pulse comprises storage capacitor means and silicon controlled rectifier means being gated into operation by said frame termination pulse.

14. The system of claim 10 in which said first circuit means comprises a plurality of line gate pulse generating means; a plurality of video line gate means, column logic means, first and second row logic means and electronic switching means for alternately gating said first and second row logic means; said first row logic means includes means for generating a fourth pulse for each even numbered ones of said plurality of line gate pulse generating means, said second row logic means includes means for generating a fifth pulse for each odd numbered ones of said plurality of line gate pulse generating means; even numbered ones of said line gate pulse generator means being respectively coupled to even numbered ones of said video line gate means, coupled to said column logic means, and being responsive to said fourth pulse to generate said second pulse; odd numbered ones of said line gate pulse generator means being respectively coupled to odd numbered ones of said video line gate means, coupled to said column logic means, and being responsive to said fifth pulse to generate said second pulse; and said column logic means being alternately responsive to said first and second row logic means for generating said third pulse for each of said columns, odd and even numbered ones of said video line gate means being alternately responsive to said second pulse and the video input signal to provide interlaced scanning of said odd and even numbered rows of said coincident circuit means, and said odd and even ones of said second circuit means individually being responsive to one of said plurality of third pulses and to one of said plurality of discrete bits of the video input signal to permit one of said plurality of storage capacitors to be charged in proportion to the amplitude of one of said plurality of discrete bits of the video input signal.

15. The system of claim 10 in which is included chopper means for converting the video input signal into discrete bits, and in which each of said plurality of video gate means is provided with first and second input terminal means and an output terminal means, said first input terminal means having applied thereto a signal comprising said second pulse, said second input terminal means being connected to said chopper means, said output signal being dependent upon simultaneous application of signals to said first and second input terminals, and said output signal comprising a succession of discrete bits of the video input signal.

16. The system of claim 15 in which is included first, second, and third chopper means for respectively converting the green, blue, and red video input signal into discrete bits which are applied to each oF said color triads by a minimum of three of said video line gates, said color triads individually including at least three of said signal driver means and at least three of said signal storage means which are substantially charged simultaneously, said plurality of color triads being charged sequentially to the various amplitudes of the video signal, said predetermined portion of the video information including at least one field of multi-colored video information for displaying a natural-like image.

17. The video reproduction system of claim 15 in which each of said plurality of transistors additionally includes a gate and a source, said source of each of said transistors being connected to a common ground and said capacitor means each being provided with first and second terminals, said first terminals thereof respectively being coupled to said gates of said transistors and to said second circuit means and said second terminals of said capacitor means respectively being coupled to said ground common to said plurality of transistors.

18. The system of claim 17 i0 which each of said second circuit means comprises silicon controlled switch means, said second circuit means having first and second input terminal means and an output terminal means, said first input terminal means having applied thereto said output signal from one of said plurality of video gate means, said second input terminal means having applied thereto one of said third pulses from said column logic means, said output terminal means individually having a signal thereon dependent upon said second circuit means simultaneously receiving one of said third pulses and said video signal and said output signals collectively constituting a plurality of various amplitude signals comprising discrete bits of the input video signal which collectively comprise the input video signal in its entirety, said output terminal means respectively being connected to said first terminals of said plurality of storage capacitor means to individually charge to the instantaneous amplitude of the input video signal and to collectively charge to various amplitudes comprising the composite input video signal in its entirety.

19. The video reproduction system of claim 18 in which said signal storage means additionally includes a plurality of solid state diode means respectively being interposed between said first terminals of said plurality of storage capacitor means and said first terminals of said plurality of resistor means for isolating said plurality of storage capacitor means from said triggering means.

20. The video reproduction system of claim 17 in which said signal storage means additionally includes a plurality of resistor means respectively having first and second terminals thereto, said first terminals thereof respectively being connected to said first terminals of said plurality of storage capacitor means and to said gates of said transistors and said second terminals thereof respectively being connected to said common ground for establishing a time constant having predetermined duration for allowing said plurality of storage capacitor means collectively to be charged consecutively to various amplitudes representing said discrete bits of a predetermined portion of the video signal, said portion including at least one field of video information, said plurality of resistor means additionally causing said luminescence pulse to be applied to said gates of said plurality of transistor means when emanated by said triggering means.

21. The video reproduction system of claim 20 in which said signal driver means additionally includes a plurality of solid state zenor diode means for enabling said plurality of storage capacitor means to rapidly discharged immediately subsequent to said luminescence means being caused to luminesce, and a plurality of parallel arranged resistance-capacitance circuit means for precluding the discharge of said plurality of capacitor means until said luminescence means are caused to luminesce, said plurality of zenor diode means and said resistance-capacitance circuit means respectively having first and second terminals thereto with said first terminal thereof being interconnected, said second terminals of said zenor diodes being connected to said common ground, and said second terminals of said resistance-capacitance circuits being connected to said triggering means.

22. The video reproduction system of claim 17 in which said storage means additionally includes a plurality of diode means respectively interposed between said second terminals of said plurality of storage capacitor means and said common ground for respectively providing first unilateral paths for current to flow while said plurality of storage capacitor means are being charged, said plurality of diode means respectively having anodes and cathodes, said anodes respectively being connected to said second terminals of said plurality of storage capacitor means and said cathodes respectively being connected to said common ground, and a plurality of transistor means for controllably providing a second unilateral path for current to flow while said plurality of storage capacitor means are being discharged, said transistor means respectively having gate, drain, and source terminals thereto with said source terminals respectively being connected to the junction of said second terminals of said storage capacitor means and said anodes of said plurality of diode means, said drain terminals respectively being connected to said common ground, said additional pulse generated by said triggering means being a negative pulse, and said gate terminals respectively being responsive to said additional pulse.

* * * * *